(12) United States Patent
Dong et al.

(10) Patent No.: US 11,543,592 B2
(45) Date of Patent: Jan. 3, 2023

(54) MODULAR ASSEMBLY FOR OPTO-ELECTRONIC SYSTEMS

(71) Applicant: II-VI Delaware, Inc., Wilmington, DE (US)

(72) Inventors: Po Dong, Cupertino, CA (US); Juthika Basak, San Jose, CA (US); Jiashu Chen, Los Altos, CA (US)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

(21) Appl. No.: 17/097,250

(22) Filed: Nov. 13, 2020

(65) Prior Publication Data

US 2022/0155526 A1    May 19, 2022

(51) Int. Cl.
*G02B 6/30*    (2006.01)
*G02B 6/42*    (2006.01)

(52) U.S. Cl.
CPC .............. *G02B 6/30* (2013.01); *G02B 6/421* (2013.01); *G02B 6/4249* (2013.01); *G02B 6/4274* (2013.01)

(58) Field of Classification Search
CPC ...... G02B 6/30; G02B 6/3885; G02B 6/4274; G02B 6/423; G02B 6/4228; G02B 6/43; G02B 6/13; G02B 6/132; G02B 6/136; G02B 6/4232; G02B 6/4204; G02B 6/4246; G02B 6/1345; G02B 6/428; G02B 6/122; G02B 6/4249; G02B 6/421
USPC .......................................................... 385/14
See application file for complete search history.

(56) References Cited

U.S. PATENT DOCUMENTS

| | | | |
|---|---|---|---|
| 9,933,574 B1* | 4/2018 | Zhang | G02B 6/4239 |
| 10,942,324 B2* | 3/2021 | Evans | G02B 6/4274 |
| 2014/0010498 A1* | 1/2014 | Verslegers | G02B 6/34 |
| | | | 385/37 |
| 2019/0348386 A1 | 11/2019 | Huang et al. | |
| 2021/0165318 A1* | 6/2021 | Pendse | G02B 6/32 |
| 2021/0271037 A1* | 9/2021 | Brusberg | H01L 24/81 |

OTHER PUBLICATIONS

Optoscribe, High Precision, Complex Geometry, M x N Fiber Arrays, Optoscribe Limited 2021, 5 pages.
Optoscribe, 2d High Precision Ferrules for HD Optical Connectors, Optoscribe Limited 2020, 5 pages.
Optoscribe, Hitting The Spot: Precision Fiber Alignment, Optoscribe Limited 2020, 4 pages.
Optoscribe, The Drive for Low Cost Single Mode Transceivers, Optoscribe Limited 2017, 5 pages.

(Continued)

*Primary Examiner* — Michael P Mooney
(74) *Attorney, Agent, or Firm* — Blank Rome LLP

(57) ABSTRACT

A modular assembly for opto-electronic systems has a substrate on which various photonic integrated circuit (PIC) chips and electronic integrated circuit (EIC) chips are mounted. One or more waveguide (WG) chips mounted on the substrate align the optical communication between the PIC chips and fiber blocks for optical fibers. Preconfigured electrical connections in the substrate allow the PIC and EIC chips to communicate with one another and to communicate with solder bumps on the substrate for integration of the modular assembly with other electronic components.

20 Claims, 5 Drawing Sheets

(56) References Cited

OTHER PUBLICATIONS

Optoscribe, Precision Optical Fiber Alignment Structures, Optoscribe Limited 2019, 6 pages.
Optoscribe, Laser Inscribed 3D Waveguides and Microstrucutres in Glass, Optoscribe Limited 2018, 4 pages.
Optoscribe, The Journey From 100G to 400G and Beyond, Optoscribe Limited 2017, 4 pages.

* cited by examiner

MODULAR ASSEMBLY FOR OPTO-ELECTRONIC SYSTEMS

FIELD OF THE DISCLOSURE

The subject matter of the present disclosure is directed to a wafer scale assembly of Photonic Integrated Circuits (PICs) and electronic integrated circuits (EICs). The techniques disclosed herein provides micron or sub-micron precision in coupling a multi-channel fiber array to the PICs of such an assembly.

BACKGROUND OF THE DISCLOSURE

Space must be used efficiently when assembling complex optical subassemblies or modules having highly integrated Photonic Integrated Circuits (PICs). Coupling of light into these PICs to/from external fibers presents a particular challenge. Fiber coupling is typically achieved using active alignment, which is expensive, time consuming, and can take up value space in an assembly.

Current solutions to achieve fiber coupling involve either (i) actively aligning the PICs directly to fiber blocks, or (ii) using individual V-groove arrays aligned to the PICs using active alignment techniques or less accurate passive techniques. Active alignment techniques require expensive equipment, whereas passive alignment techniques can result in larger coupling losses, and hence lower performance.

The subject matter of the present disclosure is directed to overcoming, or at least reducing the effects of, one or more of the problems set forth above.

SUMMARY OF THE DISCLOSURE

As disclosed herein, an assembly is used to integrate at least one fiber block and at least one photonic integrated circuit (PIC) chip. The at least one PIC chip has a first surface and has at least one first waveguide for optical signals. The assembly comprises a substrate and at least one waiveguide (WG) chip. The substrate has a first side with first bumpers. The first bumpers is affixable adjacent the first surface of the at least one PIC chip. The at least one waveguide (WG) chip has first and second facets and a second surface. The second surface has second bumpers affixable to the first bumpers on the first side of the substrate. The at least one WG chip has at least one second waveguide disposed therein between the first and second facets. The at least one second waveguide at the first facet is configured to couple the optical signals with the at least one fiber block. The at least one second waveguide at the second facet is configured to couple the optical signals with the at least one first waveguide of the at least one PIC chip.

As disclosed herein, an assembly is used to integrate at least one fiber block and at least one electronic integrated circuit (EIC) chip with separate electronic circuitry. The assembly comprises a substrate, at least one photonic integrated circuit (PIC) chip, and at least one waveguide (WG) chip. The substrate has a first side with first bumpers. The first bumpers are affixable adjacent the first surface of the at least one EIC chip. The at least one PIC chip has at least one first waveguide for optical signals and has a first surface. The first surface has a plurality of second bumpers affixable to the first bumpers. The at least one waveguide (WG) chip has first and second facets and a second surface. The second surface has a plurality of third bumpers being affixable to the first bumpers. The at least one WG chip has at least one second waveguide disposed therein between the first and second facets. The at least one second waveguide at the first facet is configured to couple the optical signals with the at least one fiber block. The at least one second waveguide at the second facet is configured to couple the optical signals with the at least one first waveguide of the at least one PIC chip.

As disclosed herein, an apparatus is used with a plurality of electronic integrated circuit (EIC) chips for connecting a plurality of fiber blocks to an application-specific integrated circuit (ASIC) chip. The apparatus comprises: a circuit board on which the ASIC chip is mounted; and a plurality of assemblies as disclosed above mounted on the circuit board in which the ASIC chip is the separate electronic circuitry.

As disclosed herein, a method of integrating optical signals of at least one fiber block with electronic signals of separate electronic circuitry comprises, not necessarily in sequence: mounting at least one electronic integrated circuit (EIC) chip to one or more first bumpers on a first side of a substrate; mounting at least one photonic integrated circuit (PIC) chip to one or more of the first bumpers; mounting at least one waveguide (WG) chip to one or more of the first bumpers; aligning at least one first waveguide at a second facet of the at least one WG chip to at least one second waveguide of the at least one PIC chip; connecting one or more second bumpers, disposed on a second side of the substrate and in electrical communication with one or more of the first bumpers, to the separate electronic circuitry; and connecting the optical signals of the at least one fiber block to the at least one first waveguide at a first facet of the at least one WG chip.

The foregoing summary is not intended to summarize each potential embodiment or every aspect of the present disclosure.

DETAILED DESCRIPTION OF THE DISCLOSURE

Figure 1A:
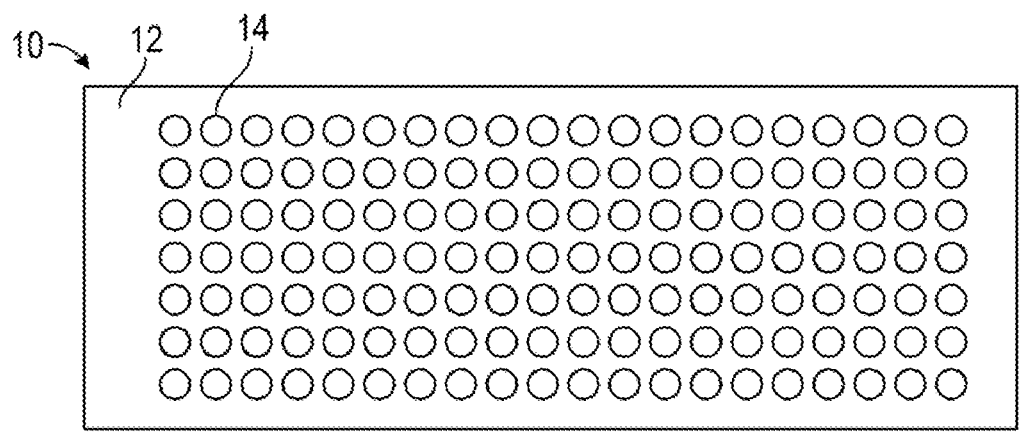
FIGS. 1A-1B illustrate a top view and a cross-sectional view of a substrate used for a multiple-chip assembly of the present disclosure.
Figure 1B:
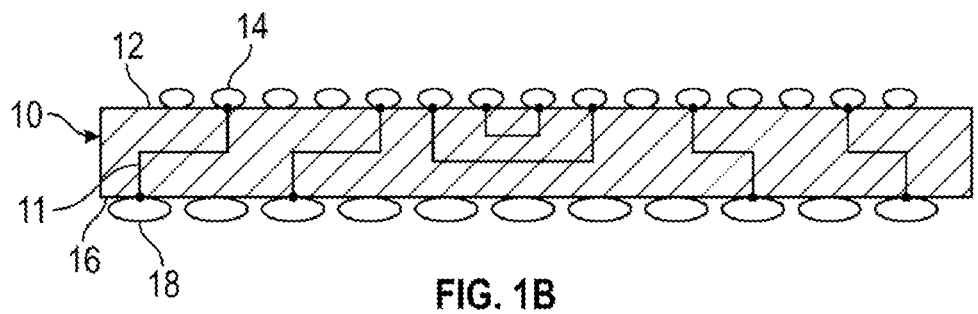

FIGS. 1A-1B illustrates a top view and a cross-sectional view of a substrate or wafer 10 used for a modular, multiple-chip assembly according to the present disclosure. The substrate 10 has first and second sides 12, 16, which respectively have first and second sets of bumpers 14, 18. Internally, the substrate 10 has electrical connections 11 configured between the first and/or second bumper 14, 18. These electrical connections 11 are prearranged during fabrication and are configured to the purposes of the substrate 10 and final assembly.

As shown here, the bumpers 14, 18 can be solder bumps. However, either side 12, 16 can have bumpers that include solder bumps, under-bump metals, or a combination thereof. Moreover, even though solder bumps and under-bumps are described, various flip-chip technologies can be used, such as ball grid array, copper pillars, stud bumps, etc. Accordingly, the bumpers 14, 18 on the substrate 10 as well as those bumpers (34, 44, 54: FIG. 2B) referenced elsewhere herein can encompass any such features used in flip-chip technologies.

Overall, the substrate 10 can be composed of a glass material, a silicon material, a ceramic material, or other material, such as used for wafers. The substrate 10 can be formed by any suitable fabrication process to include the metal for the electrical connections 11. The bumpers 14, 18 can include bumps or balls, which can be deposited using known techniques. Depending on the implementation, the bumpers 14, 18 can be composed of typical materials, such as eutectic materials, lead-free materials, or high lead materials, or the bumpers 14, 18 can be Cu-pillar bumps on wafer material.

As fabricated, the substrate 10 can be used to mount multiple chips thereon and to integrate a modular assembly of those additional chips with components of separate electronic circuitry. For example, the substrate 10 can be used for flip-chip bonding in 2-D or 2.5-D integration. At least one side 12 can receive electronic integrated circuit (EIC) chips, photonic integrated circuits (PIC) chips, and three-dimensional dimensional waveguide chips flip-chipped mounted on the side 12. Multiple layers of metals in the substrate 10 are employed as the electrical connections 11 to route electrical signals (e.g., radio-frequency signals and direct current controls) between the various the EICs and PICs, or to/from external boards and/or other electronic circuitry.

Figure 2A:
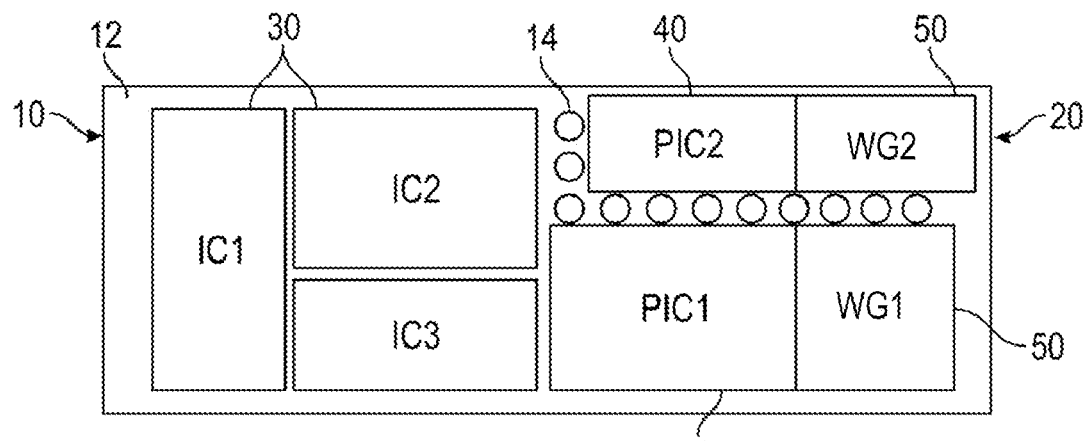
FIG. 2A illustrates a plan view of a multi-chip assembly providing direct fiber attachment.
Figure 2B:
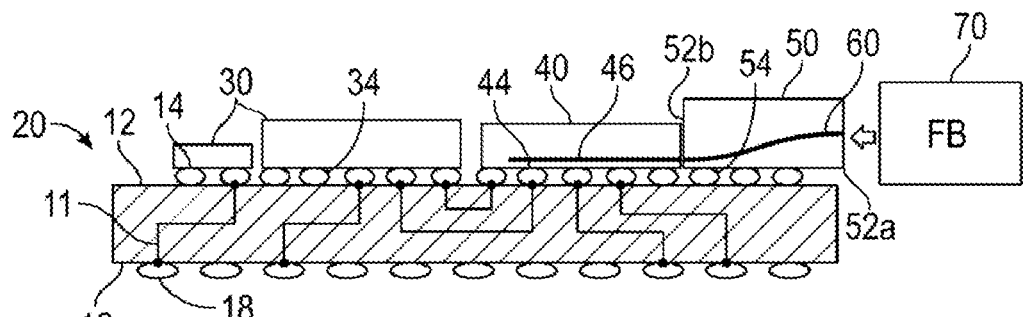
FIG. 2B illustrates a side view of the multi-chip assembly providing direct fiber attachment.

As shown in FIGS. 2A-2B, an example of a modular, multi-chip assembly 20 is illustrated in a plan view and a side view. The assembly 20 provides for direct fiber attachment with fiber blocks 70 to integrate optical signals with electronic signals.

The assembly 20 includes at least one electronic integrated circuit (EIC) chip 30, at least one photonic integrated circuit (PIC) chip 40, and at least one waveguide (WG) chip 50 flip-chipped mounted on the side 12 of the substrate 10. Here, three EIC chips 30, two PIC chips 40, and two WG chips 50 are shown, but any other combination may be used depending on the implementation.

Figure 2C:
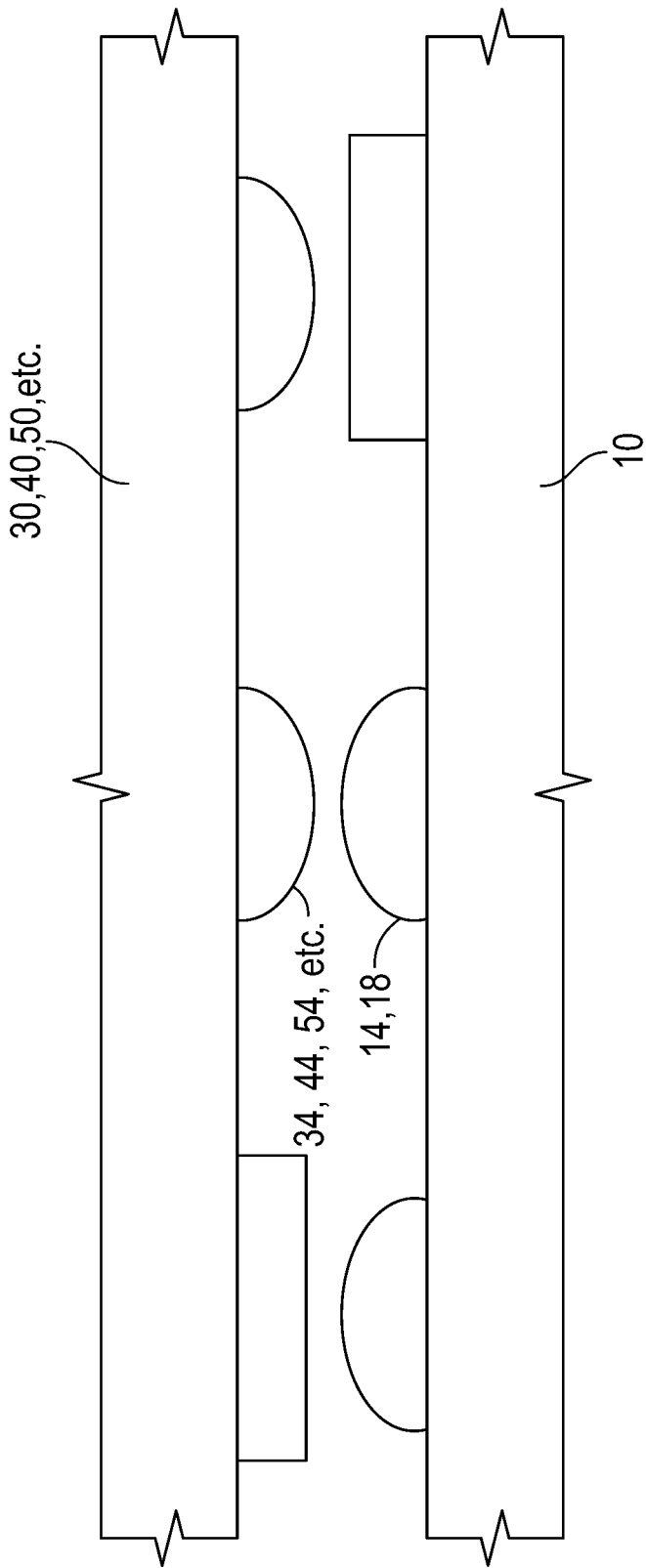
FIG. 2C schematically illustrates bumper arrangements for the disclosed assembly.

Although other implementations could provide for conventional chip mounting, the EIC chips 30 are preferably flip-chipped mounted on the bumpers (e.g., solder bumps 14) of the substrate 10 so that pin holes are not needed. In particular, the EIC chips 30 can have under-bump metals (34) that can affix to the substrate's solder bumps 14. Similarly, the PIC chips 40 and the WG chips 50 can have under-bump metals (44, 54) that can affix to the substrate's solder bumps 14. Of course, other arrangements can be used depending on the bumpers. For example and as schematically shown in FIG. 2C, the substrate 10 can have solder bumps 14, 18 that can connect to either solder bumps or under-bump metals on the EIC chips 30, PIC chips 40, the WG chips 50, or other electronic device. Alternatively, the bumpers 14, 18 on substrate 10 can be under-bump metals that can connect to solder bumps on the EIC chips 30, PIC chips 40, the WG chips 50, or other electronic device.

Preconfigured ones of these bumpers 14 have the configured electrical connections 11 to one another and/or to the bumpers 18 on the other side 16 of the substrate 10. These other bumpers 18 can be solder bumps, under-bump metals, or a combination thereof, as the case may be. As discussed later, these bottom bumpers 18 are configured to connect in communication with separate electronic circuitry in the implementation. In the end, the arrangement of bumpers 14, 18, 34, 44, 54 between substrate 10 and components 30, 40, 50, etc. depends on the implementation and can vary.

The at least one PIC chip 40 has one or more internal waveguides 46 for communicating optical signals and has a plurality of bumpers (e.g., under-bump metals 44) affixable to the substrate's bumpers (e.g., solder bumps 14) for electrical signals.

The at least one WG chip 50 has one or more internal waveguides 60 for communicating optical signals and has a plurality of bumpers (e.g., under-bump metals 54) affixable to the substrate's bumpers (e.g., solder bumps 14). The under-bumps (54) can be used primarily for placement and alignment of the WG chip 50 to the substrate, although they can be used for electrical signals.

The waveguide (WG) chip 50 functions as a bridging chip between the PIC chips 40 and various fibers of the fiber blocks 70. Overall, the WG chip 50 is composed of a glass material, a polymer material, borosilicate, or the like having waveguides 60 disposed therein. The waveguides 60 of the WG chip 50 provide variations in the horizontal and/or vertical directions to communicate optical signals between an associated fiber block 70 and PIC chip 30.

Figure 3A:
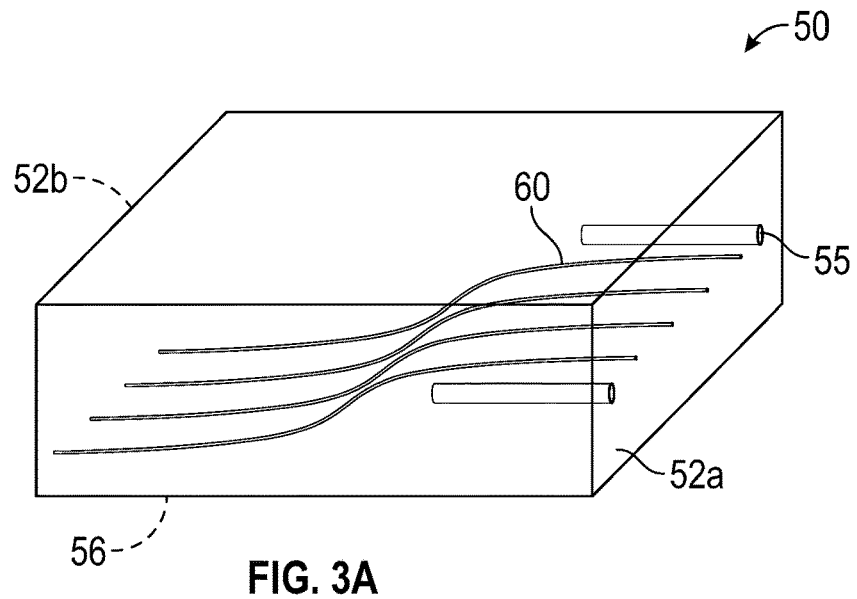
FIG. 3A illustrates a perspective view of a waveguide chip of the present disclosure.
Figure 3B:
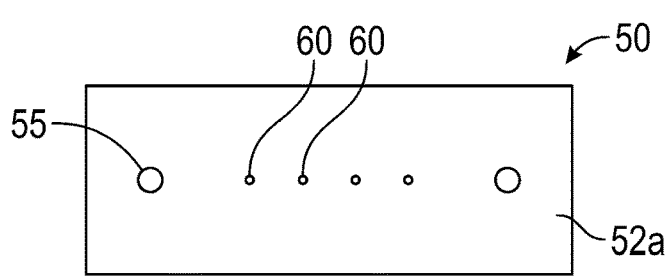
FIG. 3B illustrates an end view of the waveguide chip.
Figure 3C:
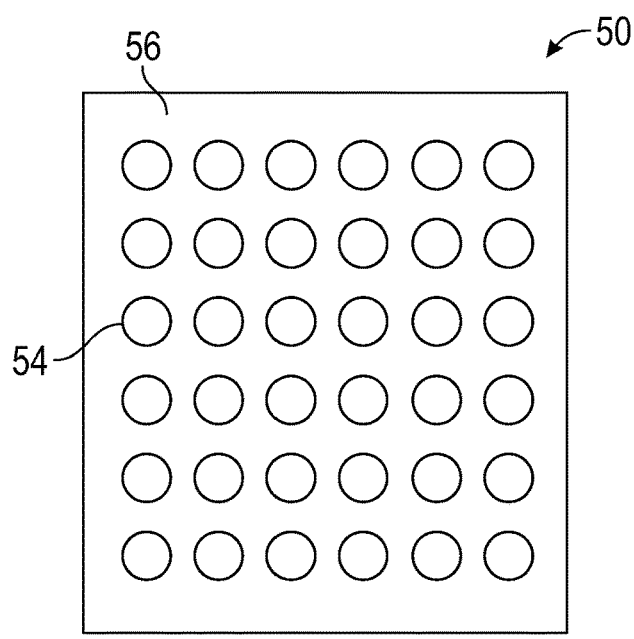
FIG. 3C illustrates a bottom view of the waveguide chip.

As shown in FIGS. 3A-3C, the WG chip 50 has first and second facets 52a-b and has a bottom surface 56 with the bumpers (e.g., under-bump metals 54) affixable to the solder bumps (14), as noted previously. The WG chip 50 has a plurality of waveguides 60 disposed therein between the first and second facets 52a-b. To facilitate assembly and alignment, the waveguides 60 in the WG chip 50 may be routed from near the bottom at one facet 52b toward the middle at the other facet 52a. Other arrangements are possible.

The WG chip 50 can have one or more alignment features to facilitate alignment with the fiber block (70) and/or the PIC chip (40). The alignment features can enable passive fiber attachment between the PIC chips (40) and the optical fibers of the fiber block (70). For example, the first facet 52a has at least two alignment features 55, such as two pin holes or slots 55, configured to accept alignment pins on a face of the fiber array block (70). In this way, the fiber array block (70) can mechanically mate with the WG chip 50, butt-coupling the fibers with the waveguides 60 without the need for active alignment. Evanescent coupling between fibers and waveguides 60 is also possible in some arrangements. Comparable types of alignment features can be used on the other face 52b for coupling to slots or pins on the PIC chip (40). Other sides of the WG chip 50 can have alignment features for positioning and aligning the chip (50) adjacent other WG chips (50) or other elements on the substrate (10) of an assembly (20).

The WG chip 50 can be but not limited to be manufactured using a 3-D laser direct writing process. In the process, a body of the WG chip 50 is formed of a particular material, such as borosilicate. The waveguides 60 can be formed in the body by changing the refractive index of material for the waveguides 60. The process can also form 3D micromachined features by changing an etch rate. Such micromachined features can be used for the mechanical alignments of components, as disclosed herein.

As shown in FIGS. 2A-2B, the fiber block 70 connects with the facet 52a of the WG chip 50 so the waveguides 60 can communicate the optical signals. The other facet 52b of the WG chip 50 is disposed adjacent the PIC chip 40 with the waveguides 60 configured to communicate optical signals with the PIC chip 40. As will be appreciated, the PIC chip 40 includes its own waveguides 46 and photonic circuit arrangement (not shown). The PIC chip's waveguides 46 can be butt-coupled to the WG chip's waveguides 60 to image the optical signals therebetween in either direction as the case may be. The PIC chip's waveguides 46 can be also evanescently-coupled to the WG chip's waveguides 60. The PIC chip's waveguides 46 can be also radiatively-coupled to the WG chip's waveguides 60, such as through grating couplers at two chips.

As shown, the assembly 20 of FIGS. 2A-2B uses the WG chips 50 to provide for direct fiber connection of fiber blocks 70 to multiple chips, including EIC chips 30 and PIC chips 40, on the preconfigured substrate 10. The chips 30, 40, 50 can be mounted and affixed in any suitable order on the substrate 10, giving consideration to efficiency and how mounting of one type of chip may interfere with the mounting of another type of chip.

For example, at least one PIC 40 and at least one WG chip 50 are flip-chip bonded with a self-alignment accuracy, which can be a micrometer or better. The optical waveguides 60 in the WG chip 50 are butt-coupled to the waveguides 46 in the PIC chip 40. The optical waveguides 60 then routes to the other facet 52a, where direct or proximate contact to the fiber array block 70 is made. As would be typical, the PIC chip 40 may have at least one active element, namely, a laser, an electro-optical modulator, a photodetector, an optical switch, or the like used in conjunction with the chip's waveguides 46.

Figure 4:
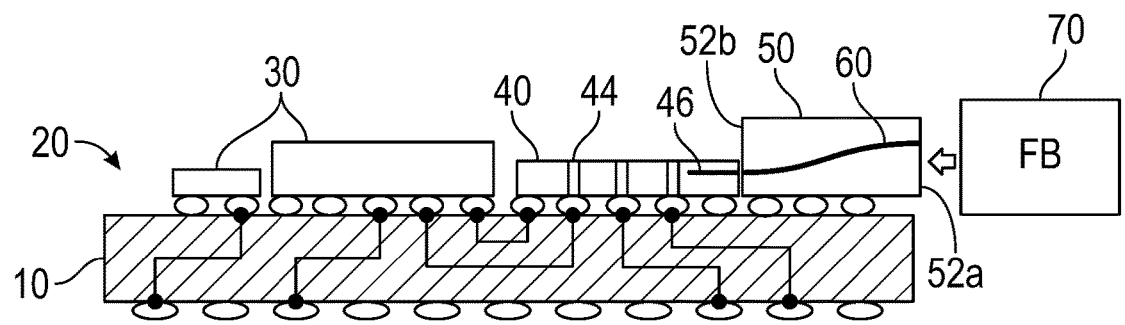
FIG. 4 illustrates a side view of a multi-chip assembly having a Photonic Integrated Circuit chip with through-silicon-vias.

A number of variations of the chips and their arrangements are possible. In one example, FIG. 4 illustrates a side view of a modular, multi-chip assembly 20 having a PIC chip with through-silicon-vias 44. As shown in this arrangement, the waveguide 46 on the PIC chip 40 can be situated toward the top surface of PIC chip 40. These vias 44 can be formed with laser induced selective etching and can be filed with copper or the like to provide electrical connectivity without requiring wire-bonding for the chip's photonic circuitry.

As discussed above, the bumpers (e.g., solder bumps 14) and preconfigured internal connections 11 of the substrate 10 allow for alignment of the multiple chips 30, 40, 50 and facilitate manufacture of the assembly 20 and its integration into separate electronic circuitry. Placement accuracy of a few microns can be achieved using CMOS fabrication processes. Self-alignment can be achieved by surface tension of the solder bumps 14 during the eutectic reflow. In this way, the multiple chips 30, 40, 50 can be flip-chipped mounted on the substrate 10 with the self-alignment capability offered by reflow of the solder bumps 14. Additional self-alignment, especially in the vertical direction (z-axis) can be achieved through the use of mechanical structures on the substrate 10 and/or on the PIC and WG chips 40, 50. A number of mechanical structures can be provided to improve accuracy of self-alignment between the various chips. These structures can include standoffs, trenches, and shoulders.

Figure 5A:
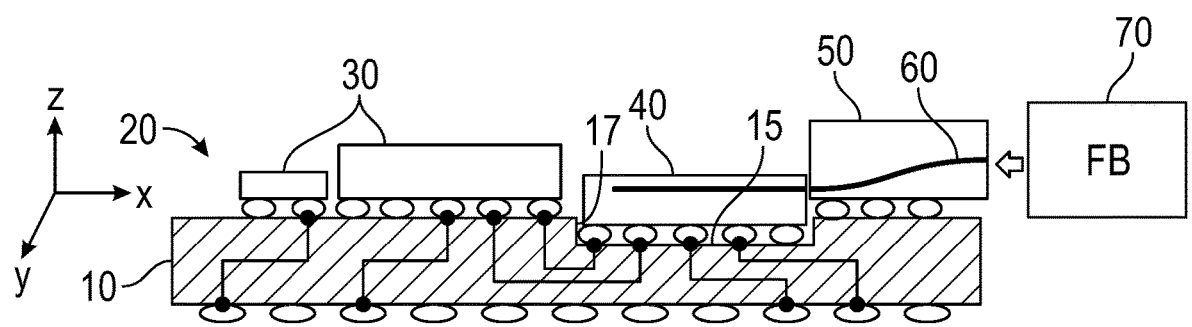
FIG. 5A illustrates a side view of a multi-chip assembly having an alignment trench.

In one example, FIG. 5A illustrates a side view of a multi-chip assembly 20 having an alignment trench 15. The trench 15 as shown is defined at a depth in a first side 12 of the substrate 10, and a PIC chip 40 can mount in the trench 15. One or more shoulders 17 of the trench 15 can provide a surface against which the PIC chip 40 mounts to facilitate horizontal (X-Y axes) alignment. Primarily, the depth of the trench 15 can facilitate vertical (Z-axis) alignment of the waveguides 60 at the second facet 54 of the WG chip 50 with the internal waveguides 46 of the PIC chip 40.

Figure 5B:
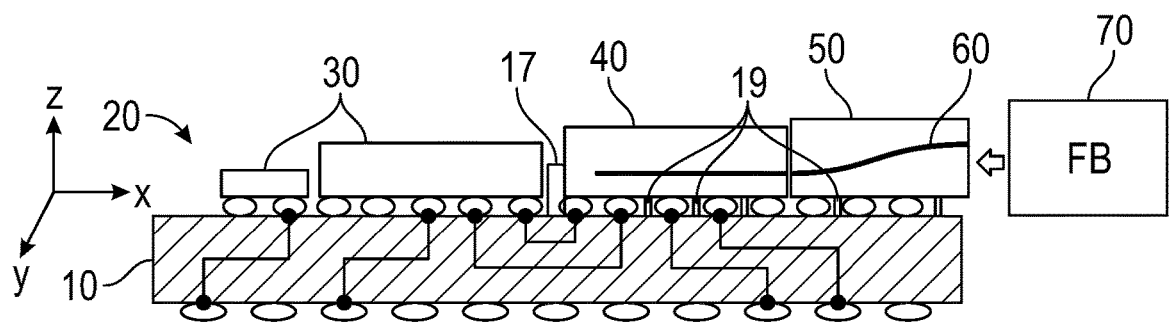
FIG. 5B illustrates a side view of a multi-chip assembly having alignment stands and shoulder.

In another example, FIG. 5B illustrates a side view of a multi-chip assembly 20 having alignment stands 19 and a shoulder 17. The stands 19 as shown can be part of the substrate 10 and can be defined at one or more heights, and the PIC chip 40 and/or the WG chip 50 can mount on the stands 19 when affixed to the bumpers (e.g., solder bumps 14). In addition or in the alternative, the stands 19 can be part of the chips 40, 50 and can distend from the bottom of the chips 40, 50 at one or more defined heights. Likewise, the stands 19 either on the substrate 10 or the chips 40, 50 can fit against a plumb surface for mainly vertical alignment or may fit within a recess or slot in the substrate 10 or chip 40, 50. As will be appreciated, stands 19 fitting in comparable recesses or slots can offer both vertical and horizontal alignment. Either way, the stands 19 can help with the vertical (Z-axis) alignment between the respective waveguides (46, 60) on the PIC chips 40 and WG chips 50.

One or more shoulders 17 can extend from the first side 12 of the substrate 10 and can provide a surface against which the PIC chip 40 (and/or WG chip 50) mounts to facilitate horizontal (X-Y axis) alignment between waveguides.

The EIC chips 30 may not require these features of trenches, stands and shoulders, but they could be equally provided for their placement on the substrate 10. Moreover, the second side 14 of the substrate 10 can include alignment features of trench, shoulder, stand, pin, slot, or the like as desired to facilitate alignment and integration into other components.

Figure 6:
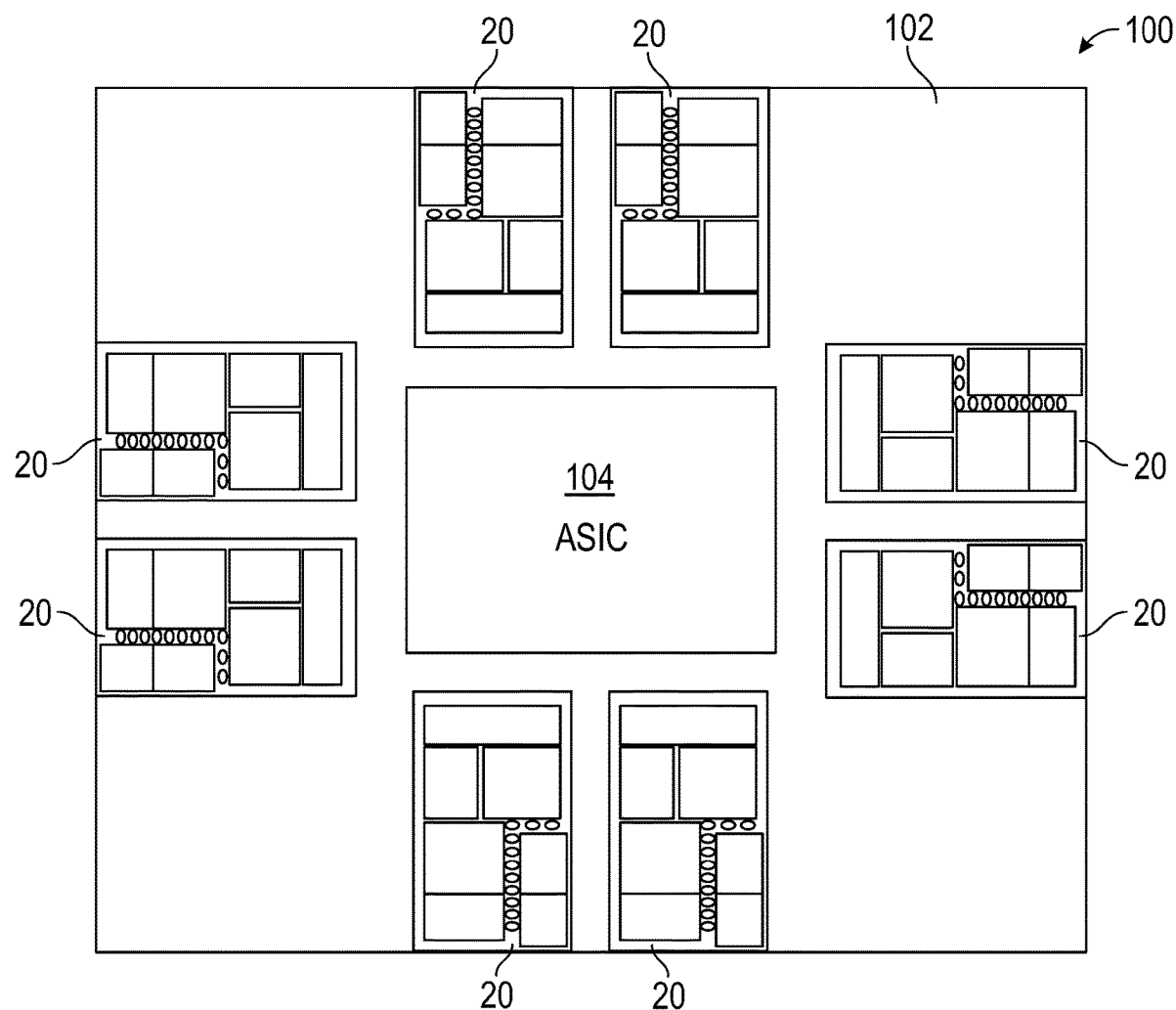
FIG. 6 illustrates an apparatus of co-packaged optics having multi-chip assemblies of the present disclosure used with an application-specific integrated circuit.

As discussed, the assembly 20 provides for multiple chips 30, 40, 50 to be mounted and integrated together in an aligned and ordered fashion on a substrate 10. Multiple modular assemblies 20 can be used together to co-package optics for integration with other electronic components. For example, FIG. 6 illustrates a plan view of a circuit 100 having multiple modular assemblies 20 of the present disclosure used with an application-specific integrated circuit chip 104, such as a switch used in signal switching and processing. The ASIC chip 104 is mounted on a circuit board 102, which includes printed circuits (not shown) and typical pin connections (not shown) for the ASIC chip 104. The assemblies 20 are mounted on the circuit board 102 with the bumpers (e.g., solder bumps) connected as configured to the printed circuits on the board 102. In this arrangement, the multiple assemblies 20 connect multiple optical signals with electronic signals of the various IC chips 30 and ASIC chip 102.

As this brief example will show, the disclosed assembly 20 can be used in conjunction with other assemblies 20 and with other circuitry to facilitate fabrication and manufacture of equipment integrating optical signals and electronic signals.

As disclosed herein, the assembly 20 provides alignment between electronic integrated circuits (EICs) 30 and Photonic Integrated Circuits (PICs) 40 and further provides self-alignment of fibers to the PICs 40 through the use of optical bridge chips, namely, WG chips 50. The arrangement allows for fibers to be directly attached to these preassembled systems.

As disclosed herein, a WG chip 50 (or passive optical bridge chip) can be flip-chip mounted on a substrate 10 with other PIC chips 40. Both of these chips 40, 50 can be flip-chip mounted on the substrate 10 with a self-alignment accuracy on the order of a micrometer or better. The self-alignment can be mainly achieved by reflow of the bumps and under-bump metals during the flip-chip bonding. The WG chip 50 bridges optical communication between the fibers and the PIC chips 40 and allows direct attachment of fiber blocks 70.

There are several advantages. First, the assembly 20 removes any active or passive alignment required between optical chips, and between optical chips and fibers. Second, the substrate 10 can be preconfigured and used widely in fabricating multiple assemblies 20 for integration together into additional circuitry.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An assembly to integrate at least one fiber block and at least one photonic integrated circuit (PIC) chip, the at least one PIC chip having a first surface and a first face and having at least one first waveguide for optical signals, the assembly comprising:
    a substrate having a first side with first bumpers, the first bumpers being affixable adjacent the first surface of the at least one PIC chip;
    at least one waveguide (WG) chip having first and second facets and a second surface, the second surface having second bumpers affixable to the first bumpers on the first side of the substrate, the at least one WG chip having at least one second waveguide disposed therein between the first and second facets, the at least one second waveguide at the first facet being configured to couple the optical signals with the at least one fiber block, the second facet being configured to butt-couple to the first face of the at least one PIC chip, the at least one second waveguide at the second facet being configured to butt-couple the optical signals with the at least one first waveguide of the at least one PIC chip; and
    one or more stands being vertically arranged between the substrate and at least one of the at least one WG chip and the at least one PIC, the one or more stands being configured to horizontally align the butt-coupling between the at least one second waveguide of the at least one WG chip with the at least one first waveguide of the at least one PIC chip.

2. The assembly of claim 1, wherein the first bumpers comprise: (i) first solder bumps, (ii) first under-bump metals, or (iii) a combination thereof disposed on the first side of the substrate.

3. The assembly of claim 1, wherein the second bumpers comprise second solder bumps disposed on the second surface and being affixable to: (i) first solder bumps and/or first under-bump metals for the first bumpers, (ii) second under-bump metals disposed on the second surface and being affixable to the first solder bumps, or (iii) a combination thereof.

4. The assembly of claim 1 to integrate with separate electronic circuitry, wherein the substrate comprises a second side, the substrate having electrical connections configured between the first and/or second sides, the second side configured to connect to the separate electronic circuitry through third bumpers.

5. The assembly of claim 4, wherein the third bumpers comprise (i) solder bumps, (ii) under-bump metals, or (iii) a combination thereof.

6. The assembly of claim 1, wherein the substrate comprises at least one trench defined in the first side in which the at least one PIC chip positions, the at least one trench having a vertical depth configured to horizontally align the butt-coupling between the at least one first and second waveguides.

7. The assembly of claim 1, wherein the substrate comprises at least one trench defined in the first side in which the at least one WG chip positions, the at least one trench having a vertical depth configured to horizontally align the butt-coupling between the at least one first and second waveguides.

8. The assembly of claim 1, wherein the substrate comprises the one or more stands extending vertically from the first side on which the at least one PIC chip positions, the one or more stands having one or more heights configured to horizontally align the butt-coupling between the at least one first and second waveguides.

9. The assembly of claim 1, wherein the substrate comprises the one or more stands extending vertically from the first side on which the at least one WG chip positions, the one or more stands having one or more heights configured to horizontally align the butt-coupling between the at least one first and second waveguides.

10. The assembly of claim 1, wherein the at least one WG chip comprises the one or more stands extending vertically on the second surface, the one or more stands having one or more heights configured to horizontally align the butt-coupling between the at least one first and second waveguides.

11. The assembly of claim 1, wherein the substrate comprises one or more shoulders extending vertically from the first side against which the at least one PIC chip abuts, the one or more shoulders being configured to horizontally align the butt-coupling between the at least one first and second waveguides.

12. The assembly of claim 1 to integrate with at least one electronic integrated circuit (EIC) chip, wherein the first bumpers are affixable to the at least one EIC chip.

13. The assembly of claim 1, wherein the at least one WG chip comprises a body manufactured with a three-dimensional laser direct writing process, the at least one second waveguide formed in the body and comprising a different refractive index from the body.

14. The assembly of claim 1, wherein the first facet comprises at least one alignment feature configured to mate in alignment with the at least one fiber block.

15. The assembly of claim 14, wherein the at least one alignment feature comprises a pair of slots defined in the first facet and configured to receive a pair of pins extending from a second face of the at least one fiber block.

16. The assembly of claim 1, wherein a first light coupling between the at least one second waveguide and the at least one fiber block comprises butt-coupling, evanescent coupling, or radiative coupling.

17. An assembly to integrate at least one fiber block, the assembly comprising:
a substrate having a first side with first bumpers;
at least one photonic integrated circuit (PIC) chip, the at least one PIC chip having at least one first waveguide for optical signals and having a first surface and a face, the first surface having a plurality of second bumpers affixable to the first bumpers; and
at least one waveguide (WG) chip having first and second facets and a second surface, the second surface having a plurality of third bumpers being affixable to the first bumpers, the at least one WG chip having at least one second waveguide disposed therein between the first and second facets, the at least one second waveguide at the first facet being configured to couple the optical signals with the at least one fiber block, the second facet being configured to butt-couple to the face of the at least one PIC chip, the at least one second waveguide at the second facet being configured to butt-couple the optical signals with the at least one first waveguide of the at least one PIC chip; and
one or more stands being vertically arranged between the substrate and at least one of the at least one WG chip and the at least one PIC, the one or more stands being configured to horizontally align the butt-coupling between the at least one second waveguide of the at least one WG chip with the at least one first waveguide of the at least one PIC chip.

18. An apparatus used with a plurality of electronic integrated circuit (EIC) chips for connecting a plurality of fiber blocks to an application-specific integrated circuit (ASIC) chip, the apparatus comprising:
a circuit board on which the ASIC chip is mounted; and
a plurality of assemblies according to claim 17 mounted on the circuit board, first bumpers on each of the assemblies being affixable with at least one of the EIC chips.

19. A method of integrating optical signals of at least one fiber block, the method comprising, not necessarily in sequence:
mounting at least one photonic integrated circuit (PIC) chip to one or more of first bumpers on a first side of a substrate;
mounting at least one waveguide (WG) chip to one or more of the first bumpers;
butt-coupling a second facet of the at least one WG chip to a face of the at least one PIC chip;
butt-coupling the optical signals between at least one first waveguide of the at least one WG chip with at least one second waveguide of the at least one PIC chip by horizontally aligning the at least one first waveguide at the second facet of the at least one WG chip to the at least one second waveguide of the at least one PIC chip using one or more stands being vertically arranged between the substrate and at least one of the at least one WG chip and the at least one PIC chip; and
connecting the optical signals of the at least one fiber block to the at least one first waveguide at a first facet of the at least one WG chip.

20. The method of claim 19, further comprising:
mounting at least one electronic integrated circuit (EIC) chip to one or more of the first bumpers on the first side of the substrate; and
connecting one or more second bumpers, disposed on a second side of the substrate and in electrical communication with one or more of the first bumpers, to the separate electronic circuitry.

* * * * *